United States Patent Office 3,840,446
Patented Oct. 8, 1974

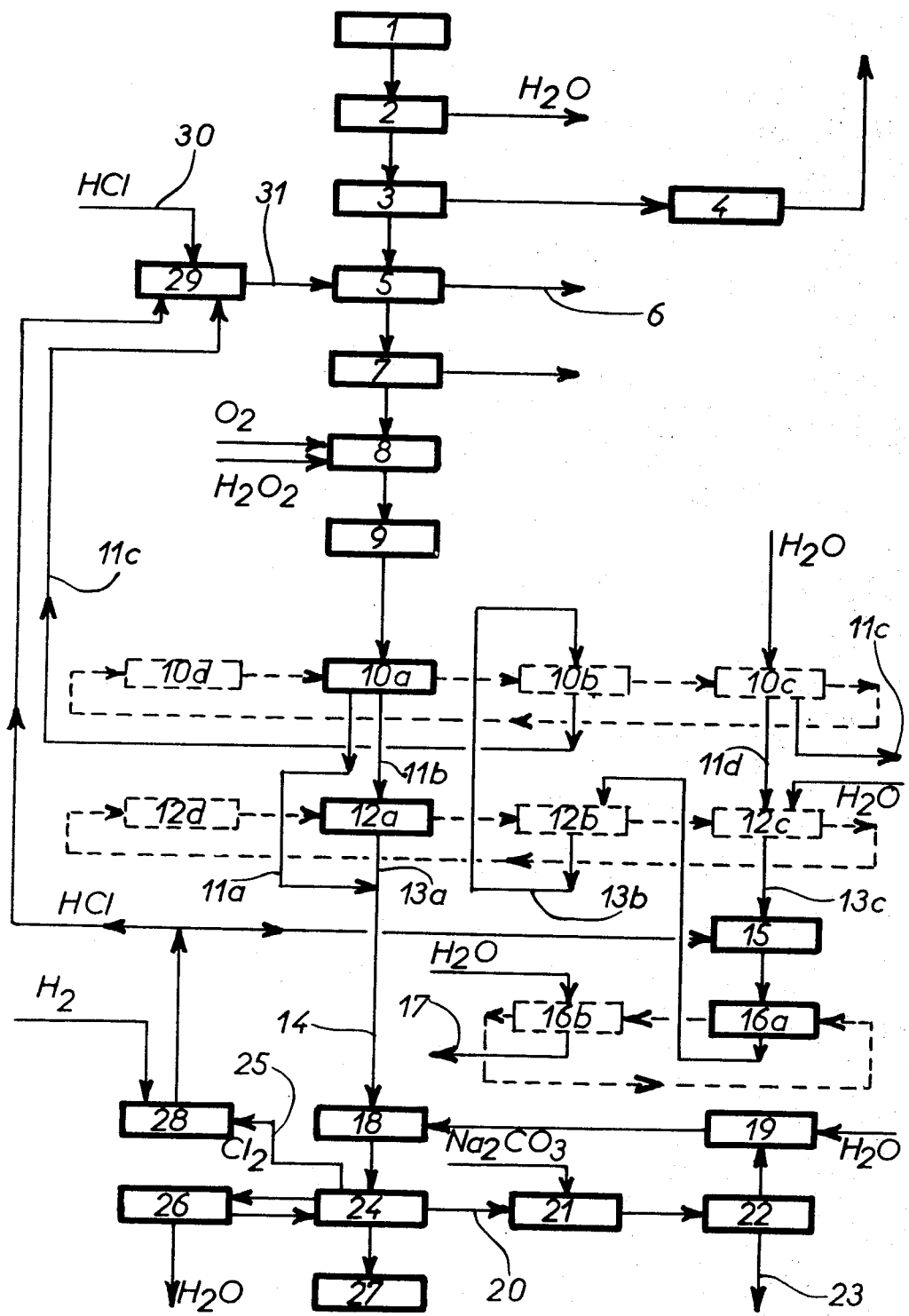

---

3,840,446
METHOD FOR PRODUCING HIGH-PURITY NICKEL FROM SULFIDIZED CONCENTRATES
Louis Gandon, Christian H. Bozec, and Philippe B. Lenoble, Le Havre, France, assignors to Societe Le Nickel, Paris, France
Filed May 24, 1972, Ser. No. 256,290
Claims priority, application France, May 24, 1971, 7118633
Int. Cl. C22b 9/08; C22d 1/14
U.S. Cl. 204—113                                6 Claims

ABSTRACT OF THE DISCLOSURE

Method for the production of high-purity nickel from sulphide concentrates characterized in that it comprises successively the following steps: (a) drying and roasting near 900° C. said sulphide concentrate; (b) dissolving in hydrochloric acid the obtained product; (c) oxidizing the iron contained in the solution resulting from the preceding step; (d) eliminating the impurities on strongly basic anion-exchange resin of the quaternary ammonium type; (e) neutralizing the slight excess of hydrochloric acidity; (f) electrolysing the nickel chloride solution purified in the preceding step, said purification step being carried out by means of two sets of resin columns mounted in series which are subjected on a cyclic manner to a regeneration by rinsing with hydrochloric acid, to an elution with water and to a restoring to the former state, by a solution of pure nickel chloride, whereby the elution solution of the first of said sets of resin columns is used for the elution of the second of said sets, then admixed with hydrochloric acid, purified on a third set of columns containing anion-exchange resin and used successively for rinsing the second one and the first one of said sets of resin columns.

---

The present invention relates to the production of high-purity nickel from sulfidized concentrations with a relatively high amount of impurities like cobalt, zinc, copper and iron. Such concentrates result for instance from the precipitation by hydrogen sulfide of metallic valuables contained in a solution which is obtained by sulphuric leaching of lateritic ores. The expression "high-purity nickel" means nickel with an amount of impurities lower than 0.05 wt.-percent.

Various methods are known for treating such sulfidized concentrates, like for instance the method which consists in turning these sulfides into sulfates by pressure leaching and purifying these sulphates by several precipitations and reductions by hydrogen in an ammoniacal medium. However, this technique involves the use of a great number of autoclaves and it is subjected to the usual difficulties inherent in the filtrations, without leading to a high-purity product. Furthermore it involves the use of a substantial amount of ammoniac which is recovered in the form of commercially unvaluable ammonium sulphate.

Several methods have been provided for treating nickel chloride solutions. But all these methods involve the presence of a great excess of free hydrochloric acid in the solution, which leads to an intricate circuit for recovering this compound and limits the capacity of the purification installations. The use of such methods is generally limited to the treatment of solutions with a relatively low amount of metallic impurities. The most common of these methods make use of ion-exchange solvents and they involve among others the following drawbacks: consumption of costly organic products, difficulties relating to the regulation of the flow of the various liquid phases and contamination by organic matters of the aqueous solutions which are generally intended for subsequent electrolytic treatment.

Furthermore, these known methods generally represent only one step in the long sequence of operations which leads to high-purity metal, i.e. a product containing more than 99.95% of nickel. Each of these steps presents a great number of possible treatments, which leads to a nearly infinite number of possible methods of production, so that it is improbable that even those skilled in the art can determine which method is industrially the most advantageous.

Therefore, one of the objects of the present invention is to provide a complete method for producing high-purity nickel from nickel concentrates, which involves lower cost and lower capital investment than do known methods.

Another object of the invention is a method for purifying nickel which involves the use of a very low amount of chemical reagents.

Another object of the invention is a method which allows an optimum use of the capacity of the installation which is used for carrying it out.

A further object of the invention is to provide such a method which can easily be employed on an industrial scale.

Yet a further object of the invention is to provide for the recovery of cobalt contained in the initial product.

In accordance with the present invention, the method comprises successively the following steps:

(1) drying and roasting near 900° C. the sulphidized concentrate;
(2) dissolving the obtained product in hydrochloric acid;
(3) oxidizing the iron contained in the solution which results from the preceding step;
(4) purifying the solution of the impurities on a strongly basic anion-exchange resin of the quaternary ammonium type;
(5) neutralizing the slight excess of hydrochloric acidity;
(6) electrolysing the thus purified nickel chloride solution.

The purification step is carried out by means of two sets of resin columns which work in series and are subjected on a cyclic way to a regeneration by successively rinsing them with hydrochloric acid, eluting them with water and restoring them to their former condition by a fraction of the purified nickel chloride solution. The solution which has been used for the elution of the first of said anion-exchange sets is used for the elution of the second of said sets, admixed with hydrochloric acid, purified on a third set of resin columns, and then used successively for rinsing the second resin set and the first resin set. The resulting hydrochloric solution is preferably recycled to the various places of the installation wherein hydrochloric acid must be injected.

Preferably, each of these sets of resin columns comprises two columns or two groups of columns mounted in series. When the first column or the first group of columns is saturated with impurities, it is subjected to a regeneration on the manner described hereinabove. It is then exchanged for the second column or the second group of columns.

As for the third set of columns, its regeneration can be carried out by means of a simple elution with water.

The sulphurous gas which is produced during the roasting of the sulphidized concentrates is preferably recovered, changed into sulphuric acid by any known method and used for the sulfuric leaching of fresh amounts of laterite.

The chlorine which is released at the anode during the final electrolysis is recovered and changed into hydrochloric gas which is recycled up-stream in the process.

When thus broadly stated, the process may appear simple, but the process is essentially a combination of steps, several of which are themselves novel, and in each step a considerable degree of care must be exercised.

An embodiment of the present invention will now be described, by way of example, with reference to the accompanying drawing which is a diagrammatical flow-sheet representing the various steps of the method according to the invention.

The initial product is a sulfidized concentrate which is produced by precipitation by means of hydrogen sulphide in a solution resulting from the sulphuric leaching of a nickel laterite. This initial product is shown as 1 on the drawing. This product is first dried, for instance in a rotary drier 2, and then roasted at 3 in a fluid bed furnace or in a rotary furnace. It is obvious that the drying and roasting steps can be carried out simultaneously if the furnace and its circuits for the recovery of gases and dusts are conveniently modified. The sulphurous gas which is released during this roasting reaction is transformed at 4 into sulphuric acid and used for lixiviating fresh amounts of laterite. The raw oxide thus obtained is screened and crushed if necessary, and dissolved at 5 in a solution of hydrochloric acid in a set of reactors provided with condensation-reflux devices. These reactors can be mounted to work either co-currently or counter-currently. During this reaction, a very small quantity of hydrogen sulphide is released at 6 and preferably recovered for precipitating, at least partly, zinc and copper contained in the eluates shown at 11e and 17 which will be described further below.

The impure solution thus obtained is separated from the residue of the hydrochloric dissolution 5 by a filtration 7. This solution is then treated at 8, either by bubbling air and subsequently chlorine into it, or by adding hydrogen peroxide to it in order to change the iron from the ferrous state into the ferric state. During this step, a precipitation of sulphur particles can take place and these particles are removed by settling on a filter at 9.

The thus oxidized impure solution flows then in a first set 10a of columns containing ion-exchange resin. The smallest elementary unit for such a set comprises two columns working in series. At the beginning, a first fraction 11a of the solution is obtained. This fraction is completely purified, i.e. is free of zinc, iron, copper and cobalt, and it is recycled directly up-stream in the process, as will be explained hereunder below. After some working time, the impurities copper and cobalt begin to appear. This working proceeds till the set 10a is saturated, which corresponds to the obtainment of a cobalt amount in the outgoing solution equal to the cobalt concentration in the solution which enters the set 10a. The latter is then regenerated according to cyclic operations shown in dotted lines on the drawing. The partially purified solution 11b, the recovery of which begins as soon as copper and cobalt appear, is then treated in a second set 12a of resin columns.

The various steps of the regeneration of the resin are the following ones:

10b—rinsing, i.e. displacing the nickel solution which impregnates the resin. This is carried out by means of a relatively concentrated hydrochloric acid solution which has already been used for rinsing resin columns of the second set 12a;

10c—eluting with water the impurities retained by the resin. This operation leads to a first fraction 11d which contains the elements which become weakly fixed as soon as the concentration of Cl⁻ ions becomes low: obviously nickel, but also cobalt and copper. The presence of nickel at this stage can partly be explained by the fact that the rinsing step 10b is carried out by means of a volume of hydrochloric acid solution which is not sufficient for totally displacing the impregnating solution. This possibility to allow an incomplete rinsing of the resin column is an original feature of the method according to the invention: it will be seen further below that this fraction 11d is conveniently used for eluting and rinsing the second set 12a of resin columns. Another reason for the presence of nickel in the fraction 11d is the fact that the hydrochloric solution used for the rinsing 10b contains intentionally a small amount of nickel as it issues from the same fraction 11d as will be shown further below. This step 10c leads in a second stage to a fraction 11e containing the greatest part of zinc present in the impurified solution, as well as some copper, cobalt and iron.

10d—restoring the resin to its former condition, i.e. preconditioning it by a fraction of purified solution which is sufficient to displace the water impregnating the resin at the end of the elution step 10c. This purified solution is taken down-stream in the process and this taking is not shown on the drawing. The second set 12a of resin columns is similar to the first one and it is regenerated following the same sequential operations which are shown at 12b, 12c, 12d. The solution 13a leaving the second set of columns is completely purified. It is admixed with the above-described fraction 11a, and leads to a final solution 14.

Each set 10a and 12a of resin columns comprises two columns or two groups of columns mounted in series. When the first column or the first group of columns is saturated, the resin is subjected to the above-described regeneration. Then, this regenerated column or group of columns is mounted at the place of the second column or of the second group of columns and the latter is mounted ahead in the sets of columns.

The various solutions which are used for the regeneration of the sets 10a and 12a of resin columns will now be described. As mentioned above, the elution 10c of the first set 10a is carried out with water, and the resulting solution 11d is used for the elution 12c of the second set 12a, this latter elution being then carried out with water during an immediately following second period.

The eluate 13c thus obtained is enriched at 15 with chloride ions by injection of hydrochloric gas till its HCl concentration is about 8 times normal. It flows then on a third set 16a of columns filled with ion-exchange resin which retains the major amount of cobalt and copper and the total amount of iron and zinc it contains.

The regeneration step 16b of this third set 16a is carried out by means of a simple elution with water giving an eluate 17 which contains the metals cobalt, copper, iron and zinc which were retained by the resin. In fact, rinsing and restoring the resin are unuseful in this case due to the low nickel concentration of the cobaltic solution which is treated there.

The eluate 17 can be freed from iron, copper and zinc by any known method and a purified cobalt chloride solution is obtained with a high commercial value. Copper can be removed by cementation with cobalt powder or by precipitation with hydrogen sulphide which eliminates also zinc. Iron can be precipitated by adjusting the pH or eliminated by selective extraction. Lastly, it is also possible to separate cobalt, copper, iron and zinc if the elution step 16d is carried out on a selective manner.

The solution issuing from the set 16a of resin columns during the phase of fixation of the impurities of this set is then used for rinsing at 12b the second set 12a of resin columns.

The fraction 13b issuing from the rinsing 12d is used in turn for rinsing at 10b the first set 10a of the resin columns. A hydrochloric solution containing nickel is thus obtained and it is re-used at 29 as will be described later.

It is noteworthy to underline that, as described above for rinsing 10b, an incomplete rinsing can be allowed at 12b, because it is carried out by means of a solution which issues from the fraction 13c contaminated with nickel after addition of hydrochloric acid at 15 and removal at 16a of cobalt, copper, iron and zinc.

The purified solution of nickel chloride 14 is then neutralized at 18 by a pulp of nickel carbonate 19 and electrolized at 24 in cells which are provided with anodes boxes for the recovery of chloride released at 25. The anodes are of graphite, or of titanium treated with ruthenium oxide.

An evaporation device 26 allows to drain off the water in excess entering into the electrolysis cell. The electrolysis produces nickel deposits 27 at the cathode.

The chlorine 25 released at the anode is recovered and changed into hydrochloric gas at 28, this gas being recycled up-stream of the process, for instance at 15 to increase the chloride ion concentration of the cobaltic eluate 13c, or at 29 to prepare the hydrochloric solution which is used for the dissolution of the raw oxide. During this preparation, a fresh amount of hydrochloric acid is added at 30, to compensate for the losses in the solutions 11e, 17 and 23.

The pulp of nickel carbonate 19 is prepared from a fraction of the catholyte 20 coming from the electrolysis. A precipitation 21, a filtration and a washing out 22 are carried out for eliminating from the mother-liquors 23 sodium and various other impurities which would have a tendency to accumulate in the electrolyte at 24.

EXAMPLE

The initial sulphidized concentrate is obtained by precipitating with hydrogen sulphide metallic valuables which are contained in a solution resulting from the sulphuric leaching of a laterite of the type occuring in several parts of Cuba and of New-Caledonia.

This wet concentrate is dried at 2 and its analysis is then about the following one in wt.-percent:

TABLE I

| | |
|---|---|
| Ni | 54.2 |
| Co | 4.88 |
| Fe | 0.43 |
| Cu | 0.16 |
| Zn | 0.99 |
| S | 35.4 |

This dry product is roasted in a fluid bed furnace 3 at an average temperature between 850 and 900° C. This roasting is autogenous, i.e. it needs practically no addition of external heat. After this roasting, one obtains a raw nickel oxide which is very reactive with hydrochloric acid solutions and which contains only very small amounts of sulphur as shown by the following analysis in weight-percent:

TABLE II

| | |
|---|---|
| Ni | 69.48 |
| Co | 6.25 |
| Fe | 0.55 |
| Cu | 0.20 |
| Zn | 1.27 |
| S | 1.20 |

The production rate of this oxide is 440 kg./h. and simultaneously about 860 Nm.³/h. of a gaseous mixture containing about 16 volume-percent $SO_2$ are recovered. The feeding conditions of the furnace are substantially 960 Nm.³/h. of injected air and 600 kg./h. of dry sulphate.

This oxide is then crushed till the totality of it passes through a sieve with 0.400 mm. meshes.

This product is introduced continuously into a battery 5 of three tanks mounted in series and provided with devices for mixing, heating, cooling, and flowing back their contents, together with an hydrochloric solution containing about 280 g./l. HCl and 56 g./l. nickel and issuing from the rinsing of columns containing ion-exchange resins as will be precised further below. The reaction temperature is about 105° C. and is easily maintained due to the fact that the reaction of nickel oxide with HCl is exothermic. The duration of the reaction is about 6 hours. The yield of the nickel dissolution thus obtained is higher than 99%. The insoluble residue is separated from the solution by a filtration 7.

The impure nickel chloride solution containing a small amount of free hydrochloric acid is first treated at 8 by bubbling air into it and by adding to it an amount of hydrogen peroxide at 110 volumes just sufficient for transforming the ferrous iron to the ferric state. During this operation, a very small amount of elementary sulphur is furthermore produced and is eliminated by a filtration 9 before the purification treatment on anion-exchange resins.

The following description relates to solutions the most characteristic compositions of which are given by table III below.

The raw solution is treated in a first step on a set 10a of two columns mounted in series, each of which contains 100 l. of a strongly basic anion-exchange resin of the quaternary ammonium type, with the commercial reference "IRA 400" of the Company "Rohm & Haas," which works in the chloride form. The solution is brought into contact with the resin at a temperature of about 70° C., the flowing rate being 10 volume per volume of resin and per hour. A first fraction 11a of completely purified solution is first recovered and then a second fraction 11b from which only zinc and iron have been eliminated and which is recovered as long as the resin column mounted ahead is not saturated. As soon as the first column is saturated, it is subjected to the operation of rinsing, elution, and restoring as described hereinbefore. It is then placed into position 2, whereas the column which was initially in position 2 is now mounted in position 1.

The preceding partially purified fraction 11b is subjected to a second purification stage in a set 12a of resin columns identical to the preceding one and working in the same conditions. A completely purified solution 13a is thus produced and admixed with the first fraction 11a of the preceding stage to form a purified solution 14 the composition of which is given by table III below.

Simultaneously, the rinsing and elution operations are carried out as indicated hereinbefore. The composition of the solutions which are the most characteristic for these operations are also given by table III below.

TABLE III.—COMPOSITION OF CHARACTERISTIC SOLUTIONS FOR THE PURIFICATION BY RESINS

| | HCl (N) | Grams per liter | | | | | Reference numeral in description and drawing |
|---|---|---|---|---|---|---|---|
| | | Ni | Co | Cu | Fe | Zn | |
| Hydrochloric solution entering the stage of dissolution of the oxide | 8.0 | 56.4 | 5.64 | 0.28 | 0.28 | 1.22 | 31. |
| Raw solution after dissolution of the oxide | 0.3 | 215 | 20.1 | 0.56 | 1.55 | 3.37 | Output of 5. |
| Partially purified solution | 0.3 | 215 | 7.5 | 0.23 | <0.01 | <0.01 | 11b. |
| Purified solution | 0.3 | 215 | <0.01 | <0.01 | <0.01 | <0.01 | 14. |
| Purified and neutralized solution (feeding of the electrolysis stage) | ¹3 | 130 | <0.01 | <0.01 | <0.01 | <0.01 | Output of 18. |
| Pn eluate | 0.03 | 0.02 | 0.06 | 0.11 | 0.02 | 1.32 | 11e. |
| Ni, Co, Cu and Fe eluate after injection of HCl | 8.0 | 6.0 | 30 | 1.10 | 3.21 | 0.31 | Output of 15. |
| Co, Cu and Fe eluate | 1.1 | 0.12 | 18.0 | 0.62 | 2.00 | 0.20 | 17. |
| Rinsing solution after the fixation of Co + Cu + Fe on resin | 6.0 | 5.9 | 0.5 | 0.02 | <0.01 | <0.01 | Output of 16a. |
| Rinsing eluate recycled for the dissolution of oxide | 6.0 | 60 | 6 | 0.3 | 0.3 | 1.3 | 11c. |

¹ pH.

The purified solution 14 issuing from the two purification stages contains a slight excess of hydrochloric acidity and is neutralized at 18 by a pulp 19 of basic nickel carbonate. The latter is prepared from a fraction of the purified solution taken at the level of the electrolysis and brought to react with sodium carbonate. The nickel carbonate thus obtained is washed at 22 until the sodium ions are almost totally eliminated, whereas the mother-liquors of the precipitation 23 permit the removal of impurities present in very small amounts which would accumulate without this drainage.

The neutralized solution is subjected to an electrolysis 24 with insoluble anodes at a high current density. The main operating conditions of this electrolysis are the following ones:

| | |
|---|---|
| Temperature | 80° C. |
| Voltage | 4.5 Volts. |
| Current density | 600 a./m.$^2$. |
| Anodes | Graphite. |
| Ni | 130 g./l. |
| Boric acid | 30 g./l. |
| pH, Cathodic compartment | 3–4. |
| pH, Anodic compartment | 1.3–1.5. |

The corresponding cathodic yield is about 98%.

The table IV below gives the composition in weight-percent of the obtained nickel cathodes 27.

TABLE IV

| | |
|---|---|
| Co | 0.005 |
| Cu | 0.005 |
| Fe | 0.003 |
| Zn | 0.002 |
| Mn | 0.004 |
| S | 0.002 |

The electrolysis cell is provided with anodic boxes which allows recovering of the chlorine 25 released at the anode. This chloride can be burnt in hydrogen for the production of hydrochloric gas which is used upstream in the process.

What we claim is:

1. A method for the production of high-purity nickel from a sulphide concentrate comprising the following successive steps:
   (a) drying said sulphide concentrate and roasting it at a temperature of about 900° C., thereby producing sulfurous gas,
   (b) dissolving the roasted product in hydrochloric acid,
   (c) oxidizing the iron contained in the impure nickel chloride solution resulting from step (b),
   (d) eliminating the impurities from the nickel chloride solution on a strongly basic anion-exchange resin of the quaternary ammonium type,
   (e) neutralizing any excess hydrochloric acid, and
   (f) electrolyzing the nickel chloride solution purified in the preceding steps thereby producing gaseous chlorine and high-purity nickel, said purification step (d) being carried out using two main sets of resin columns mounted in series, said main sets of resin columns being subjected in a cyclic manner to regeneration by rinsing them with hydrochloric acid, by eluting them with water, and by restoring them to their former state using a solution of pure nickel chloride, and in which the elution solution of the first of said sets of resin columns is used for the elution of the second of said sets, then admixed with hydrochloric acid, purified on an auxiliary set of columns containing anion-exchange resin and then used successively for rinsing the second one and then the first one of said main sets of resin columns.

2. The method according to claim 1 wherein said two main sets of resin columns and said auxiliary set of resin columns each comprises two anion-exchange apparatus mounted in series, and wherein the first one of said two anion-exchange apparatus is subjected to said regeneration when it is saturated with impurities and then interchanged with the second one.

3. The method according to claim 2 wherein said auxiliary set of anion-exchange resin columns is regenerated by elution with water.

4. The method according to claim 1, wherein the sulphurous gas produced during said roasting step (a) is recovered and transformed into sulphuric acid, the latter being used for leaching nickel ore in order to produce fresh amounts of said sulphide concentrate.

5. The method according to claim 1 wherein the chlorine released during said electrolysis step (f) is recovered and transformed into hydrochloric gas which is recycled.

6. The method according to claim 1 wherein the solution issuing from the first one of said main sets of resin columns after rinsing is used as a source of hydrochloric acid for said dissolution step (b).

References Cited

UNITED STATES PATENTS

| 3,656,940 | 4/1972 | Gandon et al. | 204—113 |
| 3,235,377 | 2/1966 | Hard et al. | 75—101 BE |
| 2,848,322 | 8/1958 | Conn et al. | 75—119 |

JOHN H. MACK, Primary Examiner

R. L. ANDREWS, Assistant Examiner

U.S. Cl. X.R.

75—101 BE, 119; 204—128